United States Patent
Abotabl et al.

(10) Patent No.: US 12,170,966 B2
(45) Date of Patent: Dec. 17, 2024

(54) FREQUENCY HOPPING ADAPTATION FOR INTER-SLOT PHYSICAL UPLINK SHARED CHANNEL REPETITION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 17/816,303

(22) Filed: Jul. 29, 2022

(65) Prior Publication Data

US 2024/0040517 A1 Feb. 1, 2024

(51) Int. Cl.
*H04W 52/32* (2009.01)
*H04B 1/713* (2011.01)
*H04L 1/08* (2006.01)
*H04L 5/14* (2006.01)

(52) U.S. Cl.
CPC ............ *H04W 52/32* (2013.01); *H04B 1/713* (2013.01); *H04L 1/08* (2013.01); *H04L 5/1438* (2013.01)

(58) Field of Classification Search
CPC .......... H04W 52/32; H04B 1/713; H04L 1/08; H04L 5/1438
See application file for complete search history.

(56) References Cited

U.S. PATENT DOCUMENTS

| | | | |
|---|---|---|---|
| 9,860,030 B2 | 1/2018 | Papasakellariou | |
| 2017/0273027 A1* | 9/2017 | Kim | .................... H04W 52/325 |
| 2020/0052827 A1 | 2/2020 | Vilaipornsawai et al. | |
| 2021/0360664 A1 | 11/2021 | Fakoorian et al. | |
| 2021/0360676 A1 | 11/2021 | Fakoorian et al. | |
| 2022/0104219 A1 | 3/2022 | Sridharan et al. | |

FOREIGN PATENT DOCUMENTS

| | | |
|---|---|---|
| EP | 4203369 A1 | 6/2023 |
| WO | 2022039580 A1 | 2/2022 |
| WO | 2022080983 A1 | 4/2022 |

OTHER PUBLICATIONS

International Search Report and Written Opinion—PCT/US2023/069539—ISA/EPO—Oct. 24, 2023.
Lenovo: "Sub-band Non-overlapping Full Duplex", 3GPP TSG RAN WG1 Meeting #109-e, R1-2204423, 3rd Generation Partnership Project, Mobile Competence Centre, 650, Route Des Lucioles, F-06921, Sophia-Antipolis Cedex, France, vol. RAN WG1, No. e-Meeting, May 9, 2022-May 20, 2022, Apr. 29, 2022, 4 Pages, XP052144026, p. 3, Paragraph.

\* cited by examiner

*Primary Examiner* — James P Duffy
(74) *Attorney, Agent, or Firm* — Patterson & Sheridan, L.L.P/Qualcomm Incorporated

(57) ABSTRACT

Certain aspects of the present disclosure provide techniques for frequency hopping adaptation. An example method generally includes receiving signaling scheduling a user equipment (UE) to transmit physical uplink shared channel (PUSCH) repetitions with frequency hopping; adapting transmission of the PUSCH repetitions with frequency hopping, for one or more full duplex slots; and transmitting the PUSCH repetitions in accordance with the adaptation.

26 Claims, 11 Drawing Sheets

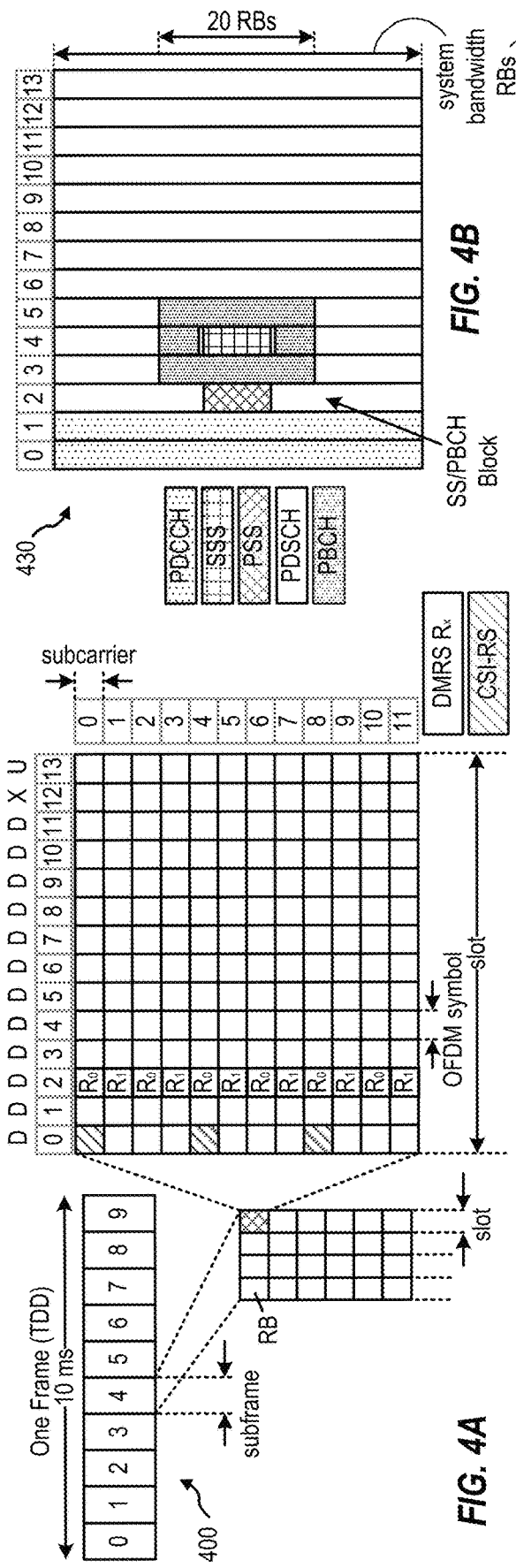
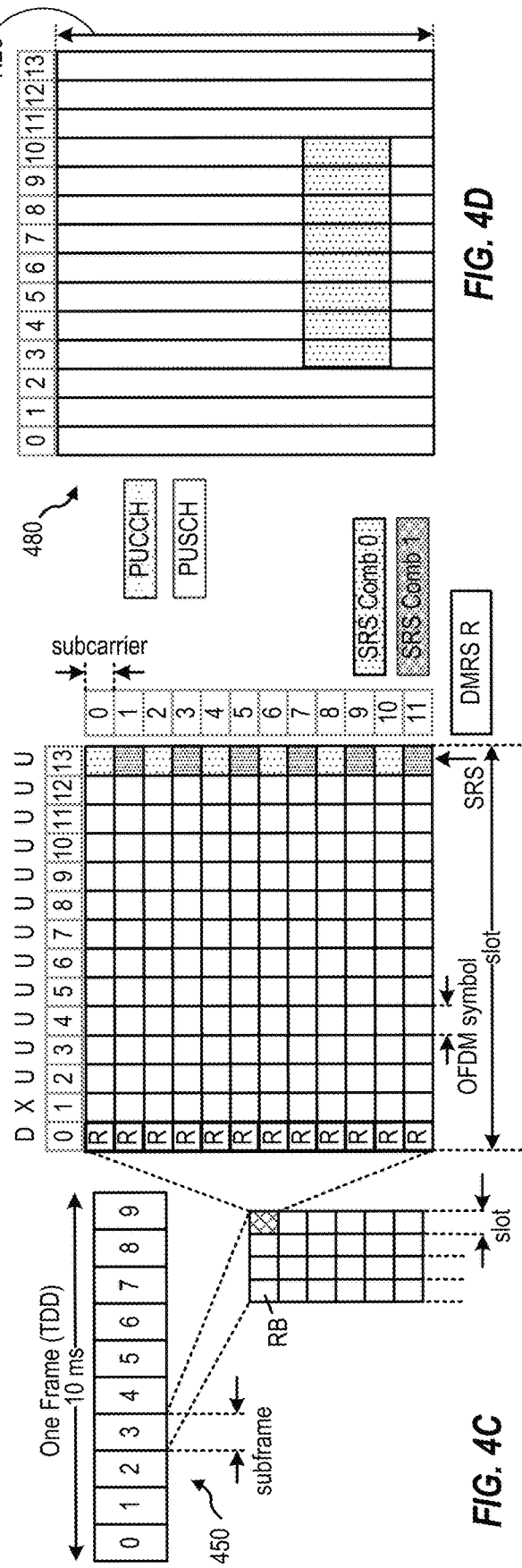
FIG. 4A
FIG. 4B
FIG. 4C
FIG. 4D

| Delta Freq. offset between UL/DL | Power back-off or MaxTx Power |
|---|---|
| 0 Hz – 10 MHx | X1 dB |
| 10MH – 35 MHx | X2 dB |
| 35 MHz – 100 MHz | X3 dB |

FREQUENCY HOPPING ADAPTATION FOR INTER-SLOT PHYSICAL UPLINK SHARED CHANNEL REPETITION

BACKGROUND

Field of the Disclosure

Aspects of the present disclosure relate to wireless communications, and more particularly, to techniques for adapting frequency hopping for uplink transmissions.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by a user equipment (UE). The method includes receiving signaling scheduling the UE to transmit physical uplink shared channel (PUSCH) repetitions with frequency hopping; adapting transmission of the PUSCH repetitions with frequency hopping, for one or more full duplex slots; and transmitting the PUSCH repetitions in accordance with the adaptation.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Aspects of the present disclosure provide apparatuses, methods, processing systems, and computer-readable mediums for adapting transmission, by a user equipment (UE) of physical uplink shared channel (PUSCH) repetitions sent with frequency hopping.

To improve reliability in wireless communications systems, certain transmissions may be sent with repetition. For example, the same version of a PUSCH may be sent as multiple repetitions. This may allow for combining at a receiver, which may increase the likelihood of successful decoding. To improve reliability, frequency hopping (FH) may also be used, where different repetitions are sent on different frequency resources (referred to as frequency hops). Using different frequency resources for different repetitions in this manner results in frequency diversity, making it less likely poor signal quality in a small set of subbands will result in decoding errors.

Some networks may use full duplex (FD) slots, which contain an uplink subband and a downlink subband, allowing for simultaneous transmission and reception by the same or different UEs. Because separate subbands are allocated for uplink and downlink, such FD slots may be referred to as subband FD (SBFD) slots. In this case, some frequency hops for a PUSCH repetition may fall on or near the edge (e.g., in a "gap") between the uplink subband and the downlink subband. This may result in cross-link interference (CLI) between the PUSCH repetition sent in the uplink subband and a downlink transmission, sent in the downlink subband, intended for another UE. In some cases, the harm caused by the CLI may outweigh the reliability benefit from the frequency hopping.

Certain aspects of the present disclosure, however, provide techniques to improve the trade-off between reliability and full-duplex interference management. For example, certain aspects of the present disclosure provide techniques for adapting uplink transmissions sent with frequency hopping, in an effort to avoid or reduce CLI in full-duplex slots. As a result, the techniques may help improve reliability and overall system performance.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
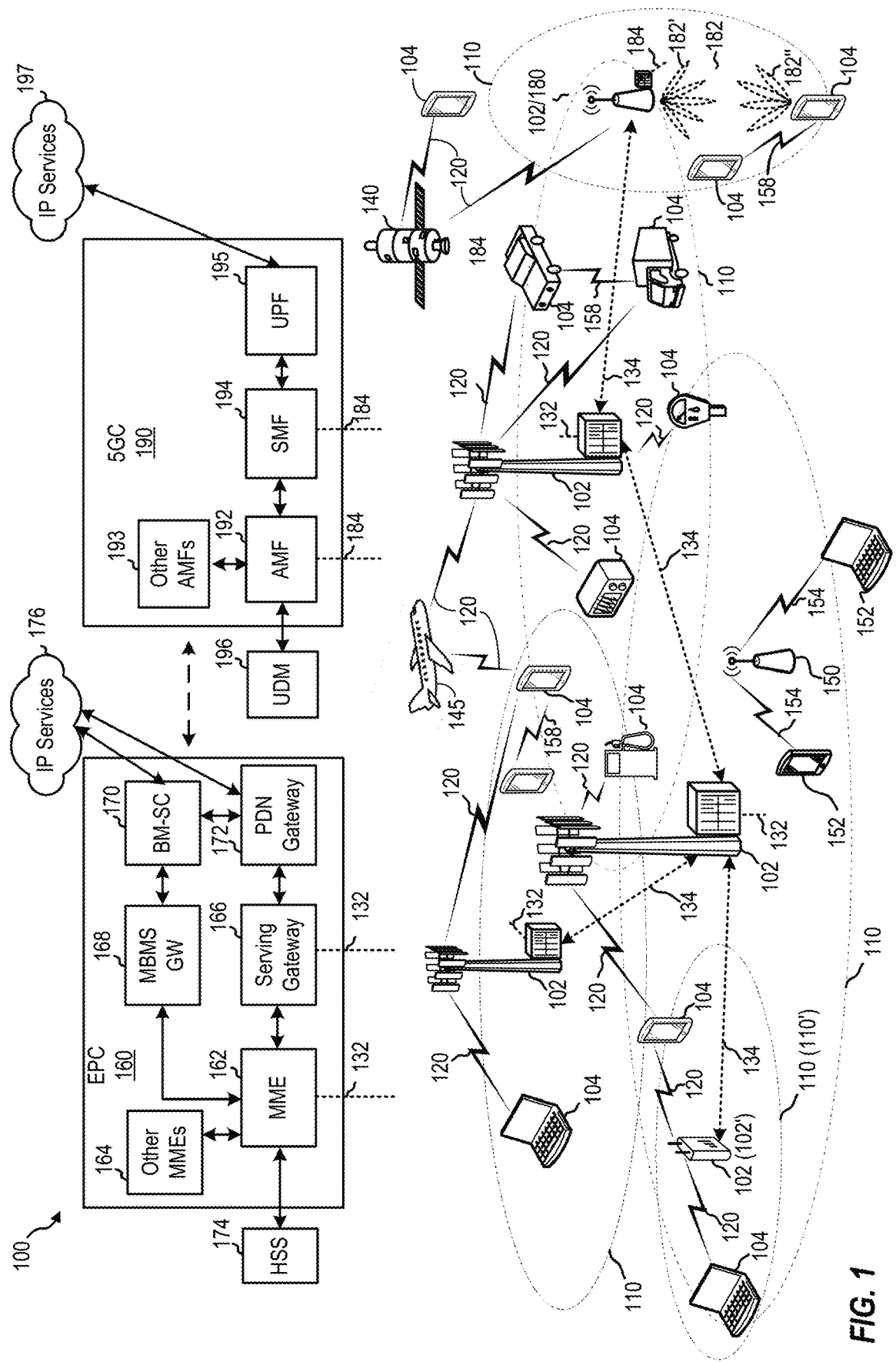
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
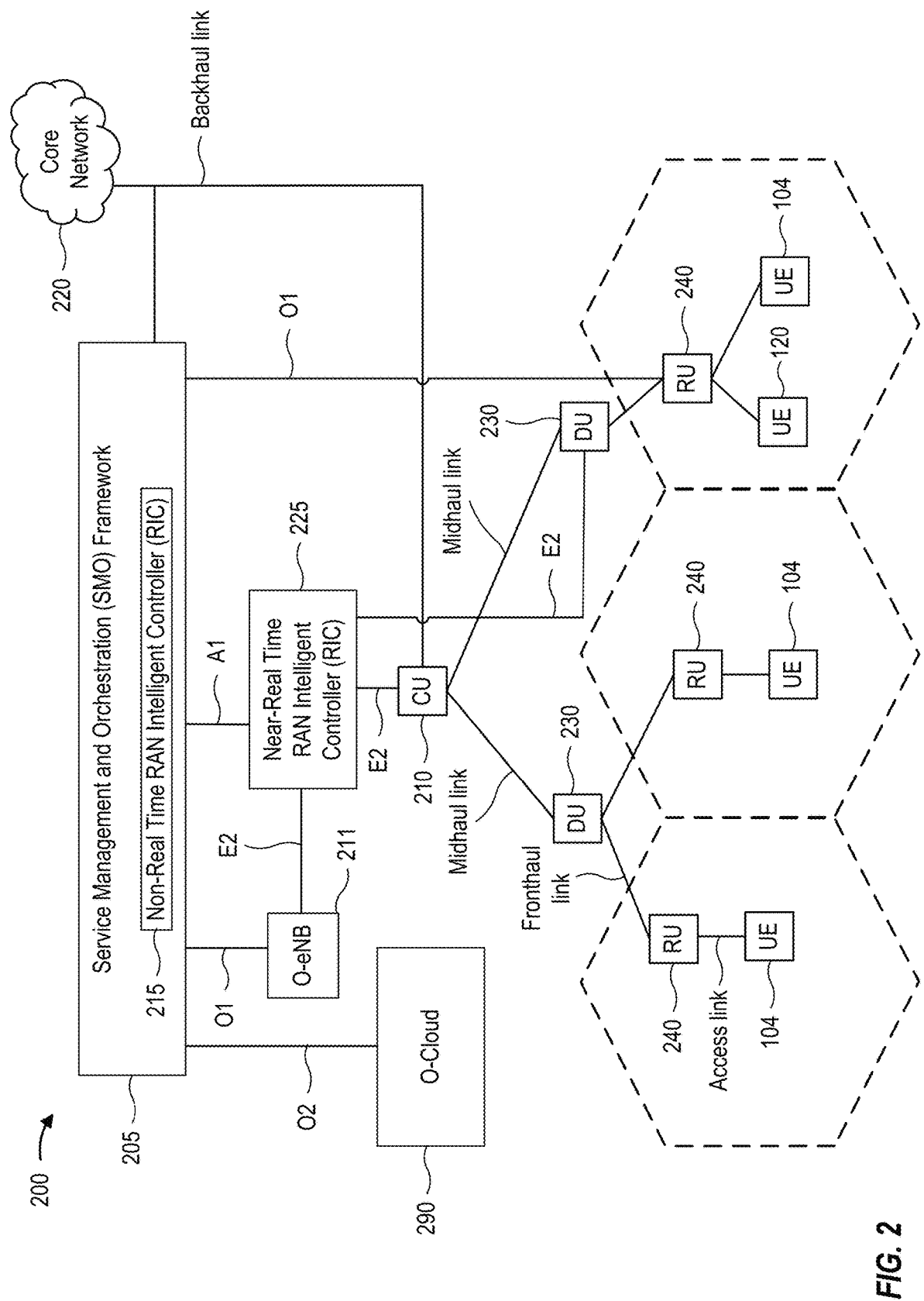
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT MC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
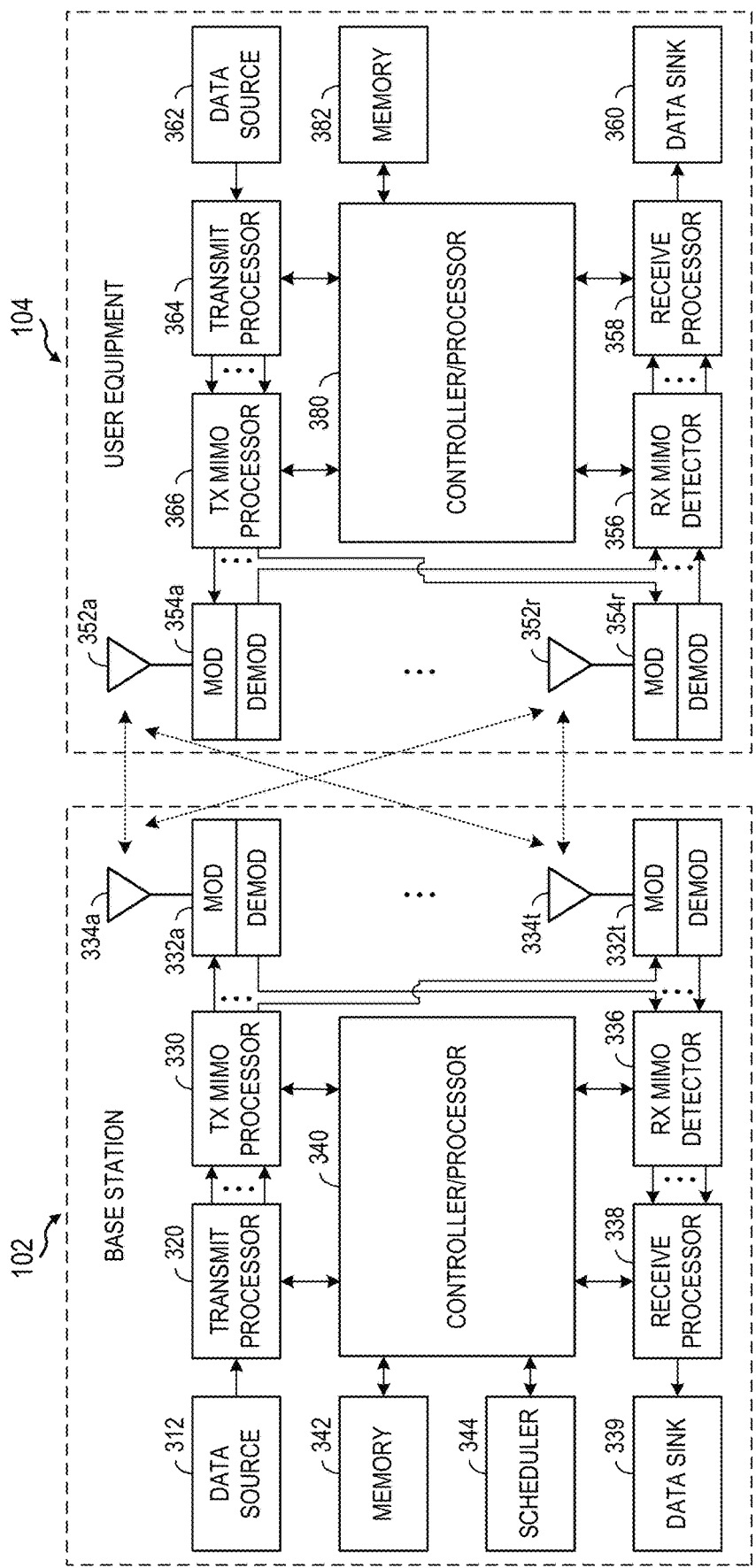
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-334t (collectively 334), transceivers 332a-332t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-352r (collectively 352), transceivers 354a-354r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/ processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

Reception (RX) MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-334t, processed by the demodulators in transceivers 332a-332t, detected by a Reception (RX) MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-332t, antenna 334a-334t, and/or other aspects described herein. Similarly, "receiving" may refer to various mechanisms of obtaining data, such as obtaining data from antennas 334a-334t, transceivers 332a-332t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-354t, antenna 352a-352t, and/or other aspects described herein. Similarly, "receiving" may refer to various mechanisms of obtaining data, such as obtaining data from antennas 352a-352t, transceivers 354a-354t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC)

signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Uplink Power Control

For uplink transmissions, a UE may determine a power control adjustment based on transmission power control (TPC) commands received in a time interval. Power state and TPC command accumulation are essential parts of an uplink power control equation. The power state was introduced to handle different beams or panels.

A UE may use the power control equation to determine the transmission power with which to transmit a physical uplink shared channel (PUSCH). The power control equation utilizes numerous parameters, such as path loss and a PUSCH power control adjustment state, to determine a first transmit power value. However, if the first transmit power value is greater than a pre-configured maximum transmit power (e.g., defined by wireless communications standards), the UE will transmit the PUSCH using the maximum transmit power.

As noted above, to improve reliability in wireless communications systems, certain transmissions may be sent with repetition. In such cases, frequency hopping (FH) may also be used, where different repetitions are sent on different frequency resources. The frequency resources used for any particular repetition may be referred to as a frequency hop.

Figure 5:
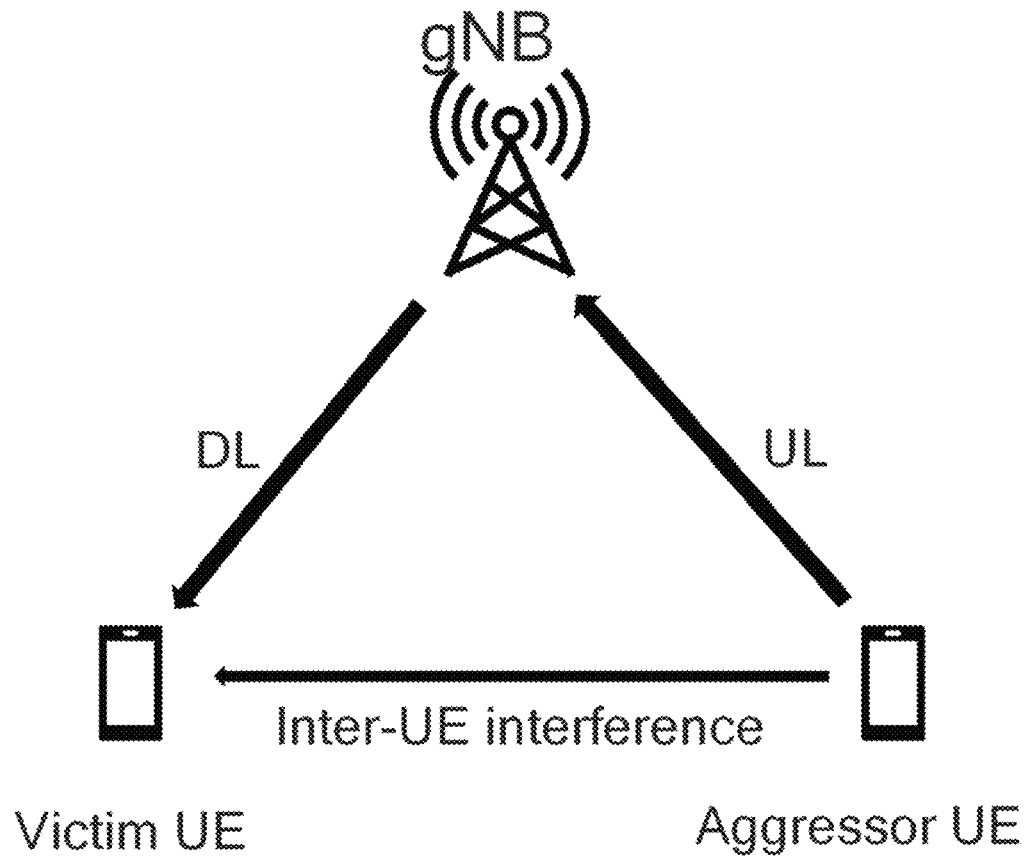
FIG. 5 depicts an example of interference between user equipments (UEs) in a wireless communications network.

In some cases, a frequency hop for a PUSCH repetition sent in a full duplex slot may fall on or near the edge (e.g., in a "gap") between an uplink subband and a downlink subband. This may cause cross-link interference (CLI) to other user equipments (UEs) receiving a downlink signal. FIG. 5 illustrates an example of such a scenario, where one UE (e.g., a victim UE) may be scheduled to receive a downlink signal from a network entity at the same time that a second UE (e.g., an aggressor UE) is scheduled to transmit an uplink signal, which may cause CLI (also referred to as inter-UE interference), as shown. In some cases, the harm caused by the CLI may outweigh the reliability benefit from the frequency hopping.

Aspects Related to Frequency Hopping Adaptation for Inter-slot Physical Uplink Shared Channel Repetitions Certain aspects of the present disclosure provide techniques to improve the trade-off between reliability and full-duplex interference management. For example, certain aspects of the present disclosure provide techniques for adapting uplink transmissions sent with frequency hopping, in an effort to avoid or reduce CLI in full-duplex slots.

Figure 6:
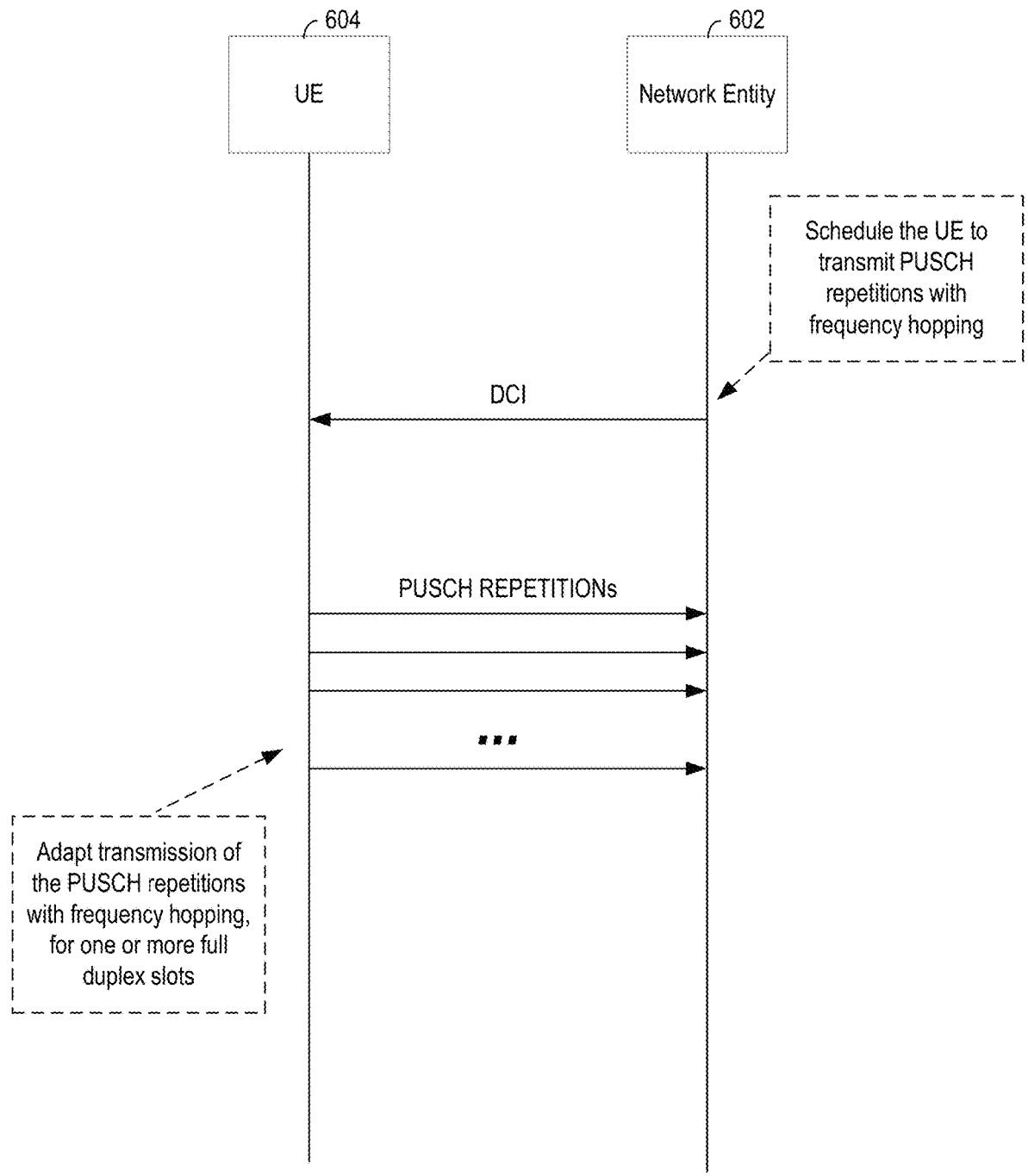
FIG. 6 is a call flow diagram illustrating a UE adapting transmission of physical uplink shared channel (PUSCH) repetitions with frequency hopping, in accordance with certain aspects of the present disclosure.

FIG. 6 is a call flow diagram illustrating an example of frequency hopping adaptation, by a UE 604, for physical uplink shared channel (PUSCH) repetitions, in accordance with certain aspects of the present disclosure.

As illustrated, a network entity 602 may transmit signaling (e.g., downlink control information (DCI)) scheduling the UE 604 to transmit PUSCH repetitions with frequency hopping. The UE 604 may then transmit the PUSCH repetitions with frequency hopping adapted for one or more full duplex slots.

In some aspects, the network entity 602 may be an example of the BS 102 depicted and described with respect to FIGS. 1 and 3 or a disaggregated base station depicted and described with respect to FIG. 2. Similarly, the UE 604 may be an example of UE 104 depicted and described with respect to FIGS. 1 and 3. However, in other aspects, UE 104 may be another type of wireless communications device and BS 102 may be another type of network entity or network node, such as those described herein.

According to certain aspects, a UE (e.g., the UE 604) may be configured to adapt frequency hopping by disabling frequency hopping for full-duplex slots.

Figure 7A:
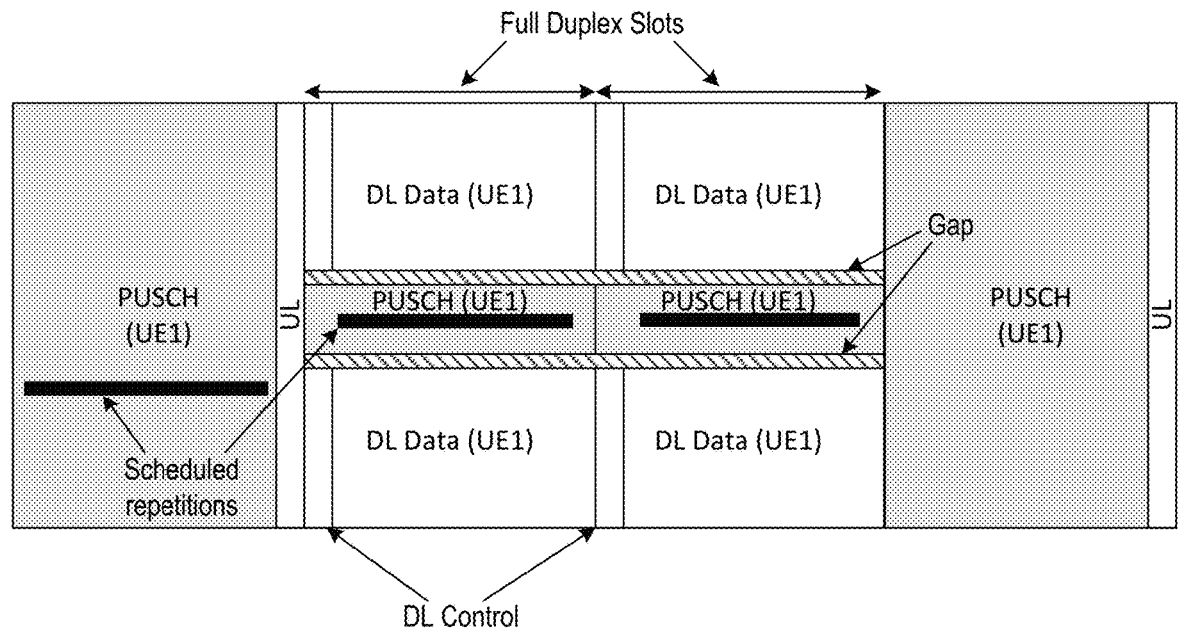
FIG. 7A and FIG. 7B depict examples of adapting frequency hopping for uplink transmissions in full duplex slots, in accordance with certain aspects of the present disclosure.

In this case, as illustrated in FIG. 7A, the UE may use a specific, preconfigured frequency domain resource assignment (FDRA), rather than frequency resources corresponding to a frequency hop for that FD slot. To avoid cross-link interference (CLI), the FDRA may be located at a position in the uplink subband of the full duplex slots that is not on or near a gap (e.g., a number of RB/RE (N RBs/REs, N being a non-zero integer) from the gap, wherein the number N may be predefined, or dynamically indicated or radio resource control (RRC)-configured.) between the uplink subband and the downlink subband of the full duplex slots. In some cases, the FDRA to be used in a sub-band full duplex (SBFD) slots may be dynamically indicated or radio resource control (RRC)-configured.

According to certain aspects, if frequency hopping would lead to a frequency allocation on or near the edge with the DL sub-band (e.g., closer to a DL sub-band than permitted, based on a minimum gap between the PUSCH occasion and the DL sub-band), the UE may instead use a specific, preconfigured FDRA allocation that is signaled specifically for the SBFD slot.

Figure 7B:
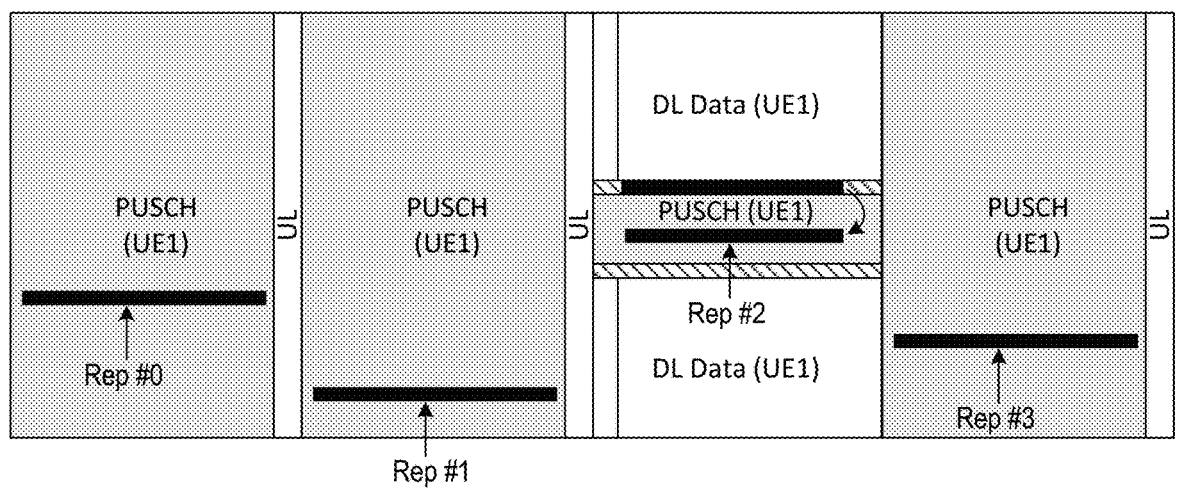

FIG. 7B illustrates the use of a default frequency domain resource allocation (FDRA) in full duplex slots with uplink frequency resources scheduled on or near a frequency gap (e.g., a guard band) between a downlink subband and an uplink subband of the full duplex slots, in accordance with certain aspects of the present disclosure. In the illustrated example, when a third repetition (Rep #2) is transmitted in a full duplex slot and a normal frequency hopping pattern would cause the third repetition to be sent on frequency resources in the gap, the UE may instead transmit the third repetition using the default FDRA.

In certain aspects, the UE may adapt transmission of a repetition with frequency hopping by adjusting transmit power. For example, the UE may determine whether or not to apply frequency hopping based on the transmit power and frequency allocation of the hop. If frequency hopping is enabled, power control may be done differently over the different hops.

Figures 8A, 8B:
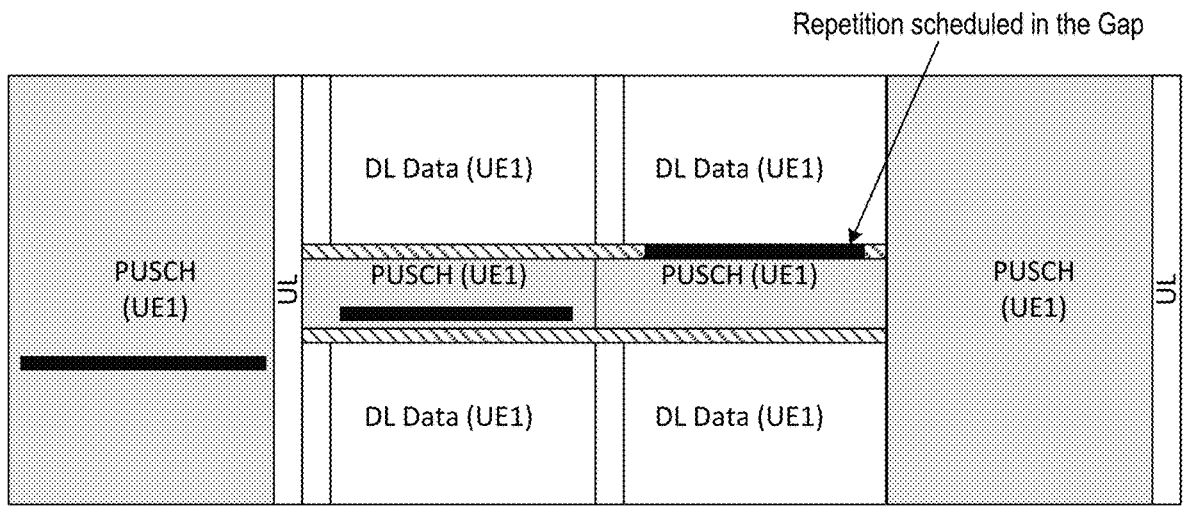
FIG. 8A depicts an example power adjustment technique, in accordance with certain aspects of the present disclosure.
FIG. 8B is an example power back-off table, in accordance with certain aspects of the present disclosure.

FIG. 8A illustrates an example power adjustment technique, in accordance with certain aspects of the present disclosure. The transmit power of the PUSCH directly affects CLI. Accordingly, if a UE wants to avoid CLI from downlink transmissions while transmitting a PUSCH, the UE may increase the transmit power. On the other hand, if the UE wants to avoid causing CLI to downlink transmissions, the UE may reduce the transmit power for PUSCH.

According to certain aspects, the UE may apply a power back-off if the calculated transmit power exceeds a given RRC configured threshold (e.g., a maximum transmit power threshold). According to certain aspects, the maximum transmit power threshold for the UE may depend on the size of a gap between uplink and downlink subbands of a given full duplex slot. For example, the UE may lower (or, in some cases, increase) the maximum transmit power threshold if the size of the gap is less than a given threshold (e.g., if a repetition is scheduled in the gap, as shown in FIG. 8A). In some aspects, dependency on the gap may be linear. For example, the power back-off may be calculated as a function of the size of the gap (e.g., the size of the gap times given parameter (e.g., an RRC configured parameter)).

In some aspects, dependency on the size of the gap can be non-linear where an RRC configured table can define the power back-off for a given gap size. FIG. 8B illustrates an example power back-off table, in accordance with certain aspects of the present disclosure. In some cases, the UE may use such a table to obtain a power back-off to apply when transmitting a PUSCH repetition in an SBFD slot.

According to certain aspects, if a calculated transmit power exceeds the transmit power threshold, the UE may be configured to use a different hop.

Figure 9A:
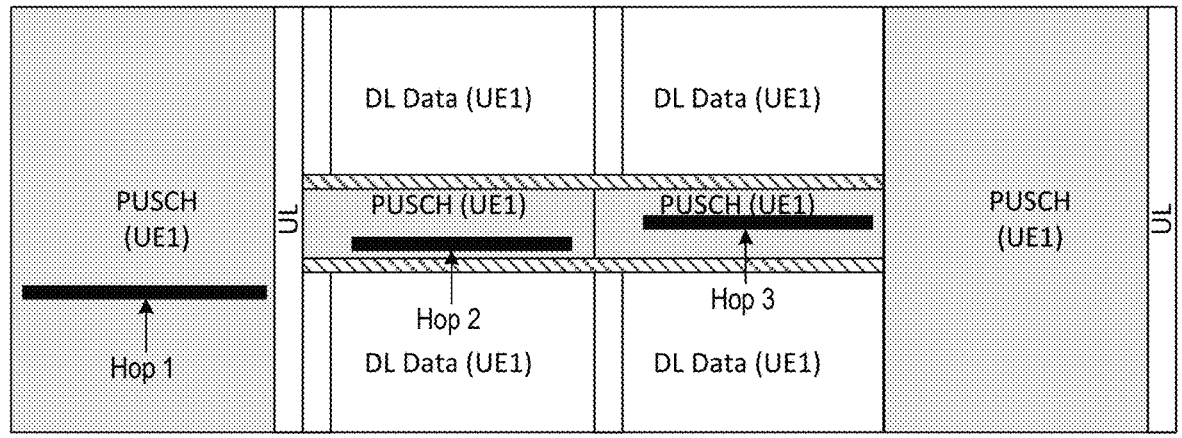
FIG. 9A depicts the use of different frequency hops in full duplex slots based on a calculated transmit power and a maximum transmit power threshold, in accordance with certain aspects of the present disclosure.

FIG. 9A illustrates the use of different frequency hops in full duplex slots based on a calculated transmit power and a maximum transmit power threshold, in accordance with certain aspects of the present disclosure.

In some aspects, the UE may be configured to use the previous hop if the previous hop has larger gap than would be present if the current hop were used. For example, in the example shown in FIG. 9A, for the repetition in the second full duplex slot, the UE may use the second hop (e.g., Hop 2) instead of a hop originally intended in that slot (e.g., Hop 3).

In some aspects, the UE may be configured to use the next subsequent hop that satisfies (e.g., is below) the maximum transmit power threshold. For example, in the example shown in FIG. 9A, for the repetition in the first full duplex slot, the UE may use the next subsequent hop (e.g., Hop 3) as long as that hop satisfies the maximum transmit power threshold. In this case, the UE may determine, for the next subsequent repetition, whether to increment the hop (e.g., use the next subsequent hop) or to repeat the hop. Continuing from the previous example, when the UE uses the third hop in the first full duplex slot, the UE may then either use the third hop again in the second full duplex slot, or the UE may use a fourth hop (not shown).

In another example, the UE may be configured to add a minimum frequency offset to the allocated uplink resources such that calculated transmit power satisfies the maximum transmit power threshold.

Figure 9B:
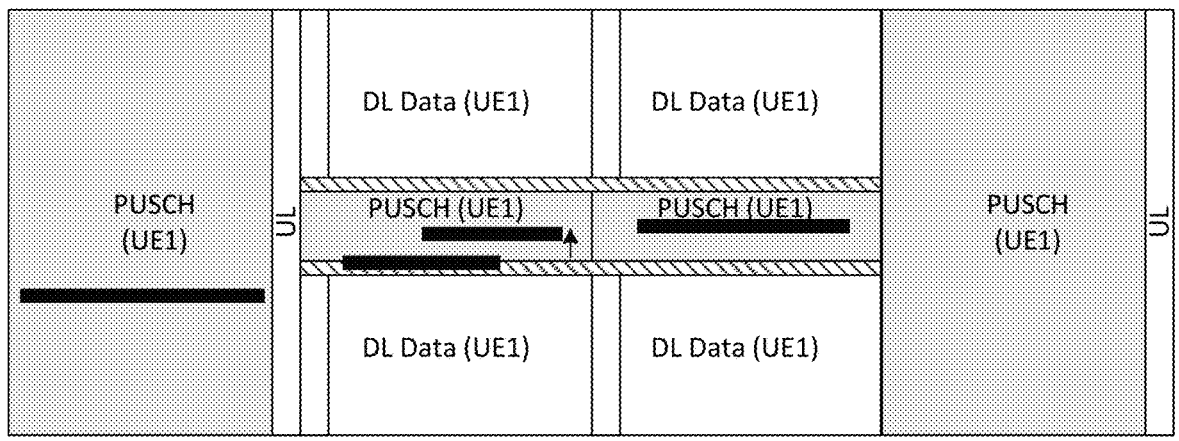
FIG. 9B depicts incrementally shifting allocated uplink frequency resources, in accordance with certain aspects of the present disclosure.

FIG. 9B illustrates incrementally shifting the allocated uplink resources, in accordance with certain aspects of the present disclosure. The value of the offset may be positive or negative (e.g., the resources may be shifted either up or down in the frequency band). For example, as shown in FIG. 9B, the UE may add a positive offset value to move the PUSCH repetition to resources further away from the lower gap.

According to certain aspects, the transmit power dependent frequency hopping techniques described above may be enabled only when certain conditions are met. For example, enabling one or more of the techniques may depend on at least one of a physical uplink control channel (PUCCH) or PUSCH priority level, a size of a gap between a frequency hop and a downlink subband, a size of a gap between two different frequency hops, or a priority of downlink signaling scheduled for a full duplex slot.

By providing techniques for adapting uplink transmissions sent with frequency hopping, aspects of the present disclosure may help avoid or reduce CLI in full-duplex slots. As a result, the techniques may help improve reliability and overall system performance.

Example Operations of a User Equipment

Figure 10:
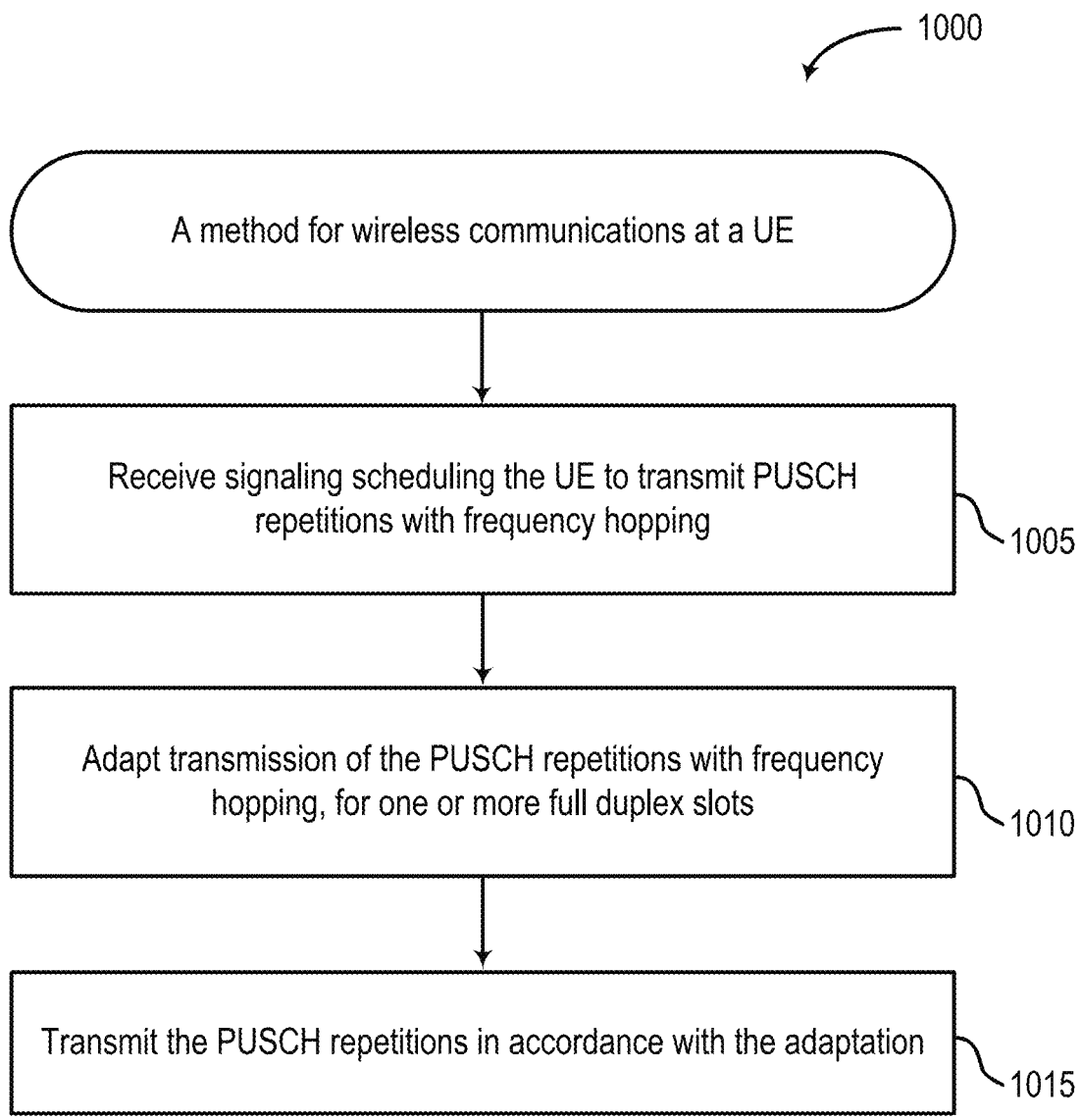
FIG. 10 depicts a method for wireless communications.

FIG. 10 shows an example of a method 1000 for wireless communications by a UE, such as UE 104 of FIGS. 1 and 3.

Method 1000 begins at step 1005 with receiving signaling scheduling the UE to transmit PUSCH repetitions with frequency hopping. In some cases, the operations of this step refer to, or may be performed by, circuitry for receiving and/or code for receiving as described with reference to FIG. 11.

Method 1000 then proceeds to step 1010 with adapting transmission of the PUSCH repetitions with frequency hopping, for one or more full duplex slots. In some cases, the operations of this step refer to, or may be performed by, circuitry for adapting and/or code for adapting as described with reference to FIG. 11.

Method 1000 then proceeds to step 1015 with transmitting the PUSCH repetitions in accordance with the adaptation. In some cases, the operations of this step refer to, or may be performed by, circuitry for transmitting and/or code for transmitting as described with reference to FIG. 11.

In some aspects, the adapting comprises: disabling frequency hopping for at least one full duplex slot; and selecting, for a PUSCH repetition in the at least one full duplex slot, a specified FDRA.

In some aspects, the method 1000 further includes receiving signaling indicating the specified FDRA. In some cases, the operations of this step refer to, or may be performed by, circuitry for receiving and/or code for receiving as described with reference to FIG. 11.

In some aspects, the adaptation is based on at least one of: a size of a first frequency gap between a downlink subband of a first full duplex slot and a location of frequency resources of a first frequency hop scheduled for the first full duplex slot; and a transmission power for a scheduled PUSCH repetition in the first full duplex slot.

In some aspects, the adapting comprises: determining that the first frequency hop for the first full duplex slot would cause the size of the frequency gap to be less than a threshold; and selecting, for the scheduled PUSCH repetition, a default FDRA defined for the first full duplex slot based on the determination.

In some aspects, the adapting comprises: determining that the size of the first frequency gap is less than a threshold; and adjusting transmit power for the scheduled PUSCH repetition, based on the determination.

In some aspects, the adjusted transmit power depends on the size of the first frequency gap.

In some aspects, the transmit power is adjusted based on: an RRC configured scaling factor; or a scaling factor obtained from a lookup table.

In some aspects, the adaptation comprises: determining a transmit power associated with the size of the first frequency gap exceeds a threshold value; and deciding to use frequency resources of a second frequency hop configured for at least one other full duplex slot, when transmitting the scheduled PUSCH repetition, in response to determining that a size of a second frequency gap of the second frequency hop is larger than the size of the first frequency gap.

In some aspects, the adaptation comprises: determining a transmit power associated with the size of the first frequency gap exceeds a threshold value; and deciding to use frequency resources of a second frequency hop configured for at least one other full duplex slot, when transmitting the scheduled PUSCH repetition, in response to determining that a transmit power associated with a size of a second frequency gap of the second frequency hop is less than the threshold value.

In some aspects, the adaptation comprises: determining a transmit power associated with the size of the first frequency gap exceeds a threshold value; and deciding to adjust frequency resources of the first frequency hop until a transmit power associated with an adjusted size of the first frequency gap is less than the threshold value.

In some aspects, the method 1000 further includes performing the adaptation when one or more conditions are met. In some cases, the operations of this step refer to, or may be performed by, circuitry for performing and/or code for performing as described with reference to FIG. 11.

In some aspects, the one or more conditions relate to at least one of: a PUCCH or PUSCH priority; a gap between a frequency hop and a downlink subband; a gap between two different frequency hops; or a priority of downlink signaling scheduled for a full duplex slot.

Figure 11:
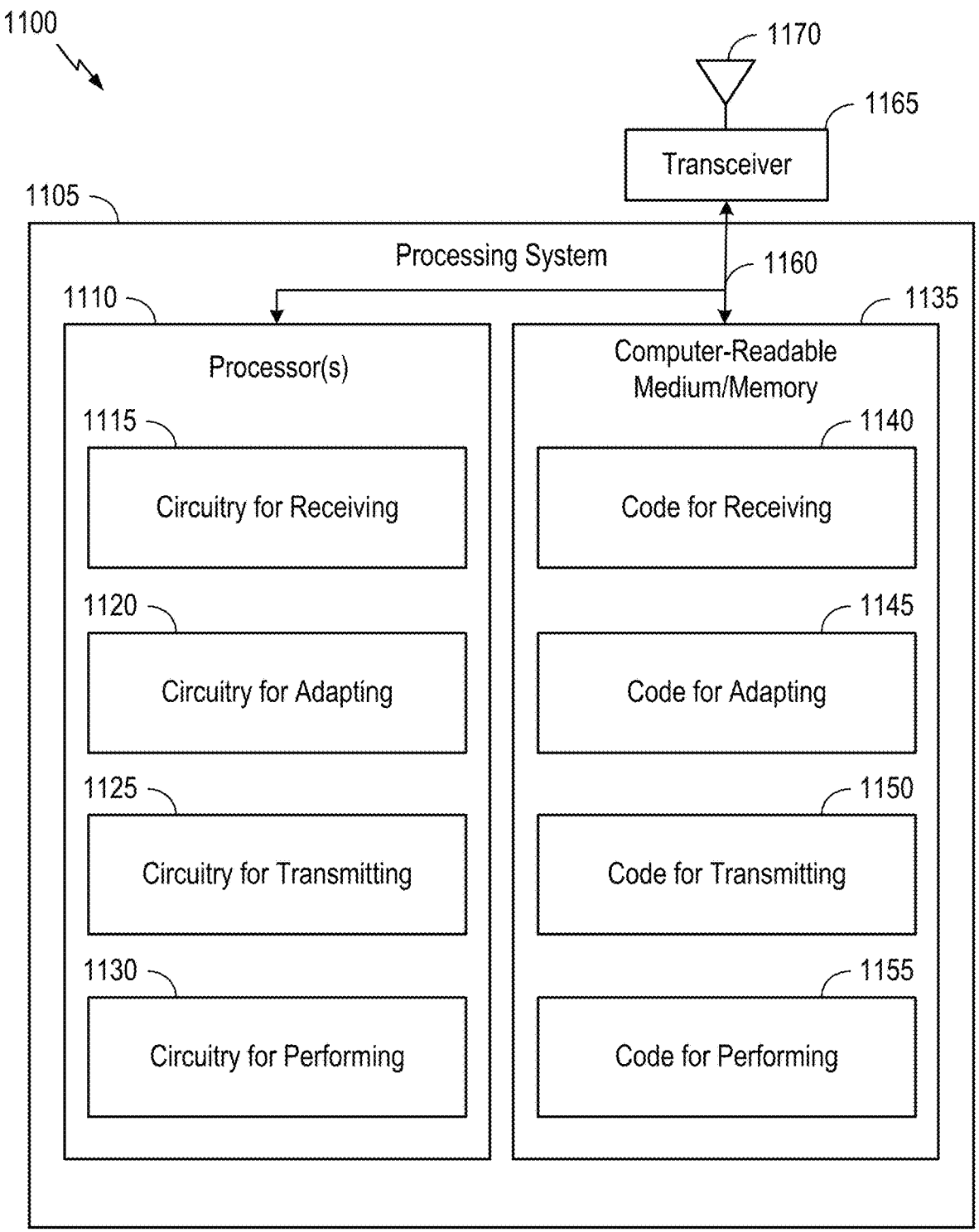
FIG. 11 depicts aspects of an example communications device.

In one aspect, method 1000, or any aspect related to it, may be performed by an apparatus, such as communications device 1100 of FIG. 11, which includes various components operable, configured, or adapted to perform the method 1000. Communications device 1100 is described below in further detail.

Note that FIG. 10 is just one example of a method, and other methods including fewer, additional, or alternative steps are possible consistent with this disclosure.

Example Communications Device

FIG. 11 depicts aspects of an example communications device 1100. In some aspects, communications device 1100 is a user equipment, such as UE 104 described above with respect to FIGS. 1 and 3.

The communications device 1100 includes a processing system 1105 coupled to the transceiver 1165 (e.g., a transmitter and/or a receiver). The transceiver 1165 is configured to transmit and receive signals for the communications device 1100 via the antenna 1170, such as the various signals as described herein. The processing system 1105 may be configured to perform processing functions for the communications device 1100, including processing signals received and/or to be transmitted by the communications device 1100.

The processing system 1105 includes one or more processors 1110. In various aspects, the one or more processors 1110 may be representative of one or more of receive processor 358, transmit processor 364, TX MIMO processor 366, and/or controller/processor 380, as described with respect to FIG. 3. The one or more processors 1110 are coupled to a computer-readable medium/memory 1135 via a bus 1160. In certain aspects, the computer-readable medium/ memory 1135 is configured to store instructions (e.g., computer-executable code) that when executed by the one or more processors 1110, cause the one or more processors 1110 to perform the method 1000 described with respect to FIG. 10, or any aspect related to it. Note that reference to a processor performing a function of communications device 1100 may include one or more processors 1110 performing that function of communications device 1100.

In the depicted example, computer-readable medium/memory 1135 stores code (e.g., executable instructions), such as code for receiving 1140, code for adapting 1145, code for transmitting 1150, and code for performing 1155. Processing of the code for receiving 1140, code for adapting 1145, code for transmitting 1150, and code for performing 1155 may cause the communications device 1100 to perform the method 1000 described with respect to FIG. 10, or any aspect related to it.

The one or more processors 1110 include circuitry configured to implement (e.g., execute) the code stored in the computer-readable medium/memory 1135, including circuitry such as circuitry for receiving 1115, circuitry for adapting 1120, circuitry for transmitting 1125, and circuitry for performing 1130. Processing with circuitry for receiving 1115, circuitry for adapting 1120, circuitry for transmitting 1125, and circuitry for performing 1130 may cause the communications device 1100 to perform the method 1000 described with respect to FIG. 10, or any aspect related to it.

Various components of the communications device 1100 may provide means for performing the method 1000 described with respect to FIG. 10, or any aspect related to it. For example, means for transmitting, sending or outputting for transmission may include transceivers 354 and/or antenna(s) 352 of the UE 104 illustrated in FIG. 3 and/or the transceiver 1165 and the antenna 1170 of the communications device 1100 in FIG. 11. Means for receiving or obtaining may include transceivers 354 and/or antenna(s) 352 of the UE 104 illustrated in FIG. 3 and/or the transceiver 1165 and the antenna 1170 of the communications device 1100 in FIG. 11.

Example Clauses

Implementation examples are described in the following numbered clauses:

Clause 1: A method for wireless communication at a UE comprising: receiving signaling scheduling the UE to transmit PUSCH repetitions with frequency hopping; adapting transmission of the PUSCH repetitions with frequency hopping, for one or more full duplex slots; and transmitting the PUSCH repetitions in accordance with the adaptation.

Clause 2: The method of Clause 1, wherein the adapting comprises: disabling frequency hopping for at least one full duplex slot; and selecting, for a PUSCH repetition in the at least one full duplex slot, a specified FDRA.

Clause 3: The method of Clause 2, further comprising: receiving signaling indicating the specified FDRA.

Clause 4: The method of any one of Clauses 1-3, wherein the adaptation is based on at least one of: a size of a first frequency gap between a downlink subband of a first full duplex slot and a location of frequency resources of a first frequency hop scheduled for the first full duplex slot; and a transmission power for a scheduled PUSCH repetition in the first full duplex slot.

Clause 5: The method of Clause 4, wherein the adapting comprises: determining that the first frequency hop for the first full duplex slot would cause the size of the first frequency gap to be less than a threshold; and selecting, for the scheduled PUSCH repetition, a default FDRA defined for the first full duplex slot based on the determination.

Clause 6: The method of Clause 4, wherein the adapting comprises: determining that the size of the first frequency gap is less than a threshold; and adjusting transmit power for the scheduled PUSCH repetition, based on the determination.

Clause 7: The method of Clause 6, wherein the adjusted transmit power depends on the size of the first frequency gap.

Clause 8: The method of Clause 6, wherein the transmit power is adjusted based on: an RRC configured scaling factor; or a scaling factor obtained from a lookup table.

Clause 9: The method of Clause 4, wherein the adaptation comprises: determining a transmit power associated with the size of the first frequency gap exceeds a threshold value; and deciding to use frequency resources of a second frequency hop configured for at least one other full duplex slot, when transmitting the scheduled PUSCH repetition, in response to determining that a size of a second frequency gap of the second frequency hop is larger than the size of the first frequency gap.

Clause 10: The method of Clause 4, wherein the adaptation comprises: determining a transmit power associated with the size of the first frequency gap exceeds a threshold value; and deciding to use frequency resources of a second frequency hop configured for at least one other full duplex slot, when transmitting the scheduled PUSCH repetition, in response to determining that a transmit power associated with a size of a second frequency gap of the second frequency hop is less than the threshold value.

Clause 11: The method of Clause 4, wherein the adaptation comprises: determining a transmit power associated with the size of the first frequency gap exceeds a threshold value; and deciding to adjust frequency resources of the first frequency hop until a transmit power associated with an adjusted size of the first frequency gap is less than the threshold value.

Clause 12: The method of any one of Clauses 1-11, further comprising: performing the adaptation when one or more conditions are met.

Clause 13: The method of Clause 12, wherein the one or more conditions relate to at least one of: a PUCCH or PUSCH priority; a gap between a frequency hop and a downlink subband; a gap between two different frequency hops; or a priority of downlink signaling scheduled for a full duplex slot.

Clause 14: An apparatus, comprising: a memory comprising executable instructions; and a processor configured to execute the executable instructions and cause the apparatus to perform a method in accordance with any one of Clauses 1-13.

Clause 15: An apparatus, comprising means for performing a method in accordance with any one of Clauses 1-13.

Clause 16: A non-transitory computer-readable medium comprising executable instructions that, when executed by a processor of an apparatus, cause the apparatus to perform a method in accordance with any one of Clauses 1-13.

Clause 17: A computer program product embodied on a computer-readable storage medium comprising code for performing a method in accordance with any one of Clauses 1-13.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment (UE) comprising:
   receiving signaling scheduling the UE to transmit physical uplink shared channel (PUSCH) repetitions with frequency hopping;
   adapting transmission of the PUSCH repetitions with frequency hopping, for one or more full duplex slots, wherein the adapting is based on at least one of:
   a size of a first frequency gap between a downlink subband of a first full duplex slot and a location of frequency resources of a first frequency hop scheduled for the first full duplex slot; and
   a transmission power for a scheduled PUSCH repetition in the first full duplex slot; and
   transmitting the PUSCH repetitions in accordance with the adaptation.

2. The method of claim 1, wherein the adapting comprises:
   disabling frequency hopping for at least one full duplex slot; and
   selecting, for a PUSCH repetition in the at least one full duplex slot, a specified frequency domain resource allocation (FDRA).

3. The method of claim 2, further comprising receiving signaling indicating the specified FDRA.

4. The method of claim 1, wherein the adapting comprises:
   determining that the first frequency hop for the first full duplex slot would cause the size of the first frequency gap to be less than a threshold; and
   selecting, for the scheduled PUSCH repetition, a default frequency domain resource allocation (FDRA) defined for the first full duplex slot based on the determination.

5. The method of claim 1, wherein the adapting comprises:
   determining that the size of the first frequency gap is less than a threshold; and
   adjusting transmit power for the scheduled PUSCH repetition, based on the determination.

6. The method of claim 5, wherein the adjusted transmit power depends on the size of the first frequency gap.

7. The method of claim 5, wherein the transmit power is adjusted based on:
   an RRC configured scaling factor; or
   a scaling factor obtained from a lookup table.

8. The method of claim 1, wherein the adaptation comprises:
   determining a transmit power associated with the size of the first frequency gap exceeds a threshold value; and deciding to use frequency resources of a second frequency hop configured for at least one other full duplex slot, when transmitting the scheduled PUSCH repetition, in response to determining that a size of a second frequency gap of the second frequency hop is larger than the size of the first frequency gap.

9. The method of claim 1, wherein the adaptation comprises:
determining a transmit power associated with the size of the first frequency gap exceeds a threshold value; and
deciding to use frequency resources of a second frequency hop configured for at least one other full duplex slot, when transmitting the scheduled PUSCH repetition, in response to determining that a transmit power associated with a size of a second frequency gap of the second frequency hop is less than the threshold value.

10. The method of claim 1, wherein the adaptation comprises:
determining a transmit power associated with the size of the first frequency gap exceeds a threshold value; and
deciding to adjust frequency resources of the first frequency hop until a transmit power associated with an adjusted size of the first frequency gap is less than the threshold value.

11. The method of claim 1, further comprising performing the adaptation when one or more conditions are met.

12. The method of claim 11, wherein the one or more conditions relate to at least one of:
a physical uplink control channel (PUCCH) or PUSCH priority;
a gap between a frequency hop and a downlink subband;
a gap between two different frequency hops; or a priority of downlink signaling scheduled for a full duplex slot.

13. A user equipment (UE) configured for wireless communication, comprising:
a memory comprising computer-executable instructions; and
one or more processors configured to execute the computer-executable instructions and cause the UE to:
receive signaling scheduling the UE to transmit physical uplink shared channel (PUSCH) repetitions with frequency hopping;
adapt transmission of the PUSCH repetitions with frequency hopping, for one or more full duplex slots, wherein the adaptation is based on at least one of:
a size of a first frequency gap between a downlink subband of a first full duplex slot and a location of frequency resources of a first frequency hop scheduled for the first full duplex slot; and
a transmission power for a scheduled PUSCH repetition in the first full duplex slot; and
transmit the PUSCH repetitions in accordance with the adaptation.

14. The UE of claim 13, wherein the adapting comprises:
disabling frequency hopping for at least one full duplex slot; and
selecting, for a PUSCH repetition in the at least one full duplex slot, a specified frequency domain resource allocation (FDRA).

15. The UE of claim 14, wherein the one or more processors are configured to execute the computer-executable instructions and further cause the UE to:
receive signaling indicating the specified FDRA.

16. The UE of claim 13, wherein the adapting comprises:
determining that the first frequency hop for the first full duplex slot would cause the size of the first frequency gap to be less than a threshold; and
selecting, for the scheduled PUSCH repetition, a default frequency domain resource allocation (FDRA) defined for the first full duplex slot based on the determination.

17. The UE of claim 13, wherein the adapting comprises:
determining that the size of the first frequency gap is less than a threshold; and
adjusting transmit power for the scheduled PUSCH repetition, based on the determination.

18. The UE of claim 17, wherein the adjusted transmit power depends on the size of the first frequency gap.

19. The UE of claim 17, wherein the transmit power is adjusted based on:
an RRC configured scaling factor; or
a scaling factor obtained from a lookup table.

20. The UE of claim 13, wherein the adaptation comprises:
determining a transmit power associated with the size of the first frequency gap exceeds a threshold value; and
deciding to use frequency resources of a second frequency hop configured for at least one other full duplex slot, when transmitting the scheduled PUSCH repetition, in response to determining that a size of a second frequency gap of the second frequency hop is larger than the size of the first frequency gap.

21. The UE of claim 13, wherein the adaptation comprises:
determining a transmit power associated with the size of the first frequency gap exceeds a threshold value; and
deciding to use frequency resources of a second frequency hop configured for at least one other full duplex slot, when transmitting the scheduled PUSCH repetition, in response to determining that a transmit power associated with a size of a second frequency gap of the second frequency hop is less than the threshold value.

22. The UE of claim 13, wherein the adaptation comprises:
determining a transmit power associated with the size of the first frequency gap exceeds a threshold value; and
deciding to adjust frequency resources of the first frequency hop until a transmit power associated with an adjusted size of the first frequency gap is less than the threshold value.

23. The UE of claim 13, wherein the one or more processors are configured to execute the computer-executable instructions and further cause the UE to:
perform the adaptation when one or more conditions are met.

24. The UE of claim 23, wherein the one or more conditions relate to at least one of:
a physical uplink control channel (PUCCH) or PUSCH priority;
a gap between a frequency hop and a downlink subband;
a gap between two different frequency hops; or
a priority of downlink signaling scheduled for a full duplex slot.

25. An apparatus for wireless communication at a user equipment (UE) comprising:
means for receiving signaling scheduling the UE to transmit physical uplink shared channel (PUSCH) repetitions with frequency hopping;
means for adapting transmission of the PUSCH repetitions with frequency hopping, for one or more full duplex slots, wherein the adaptation is based on at least one of:
a size of a first frequency gap between a downlink subband of a first full duplex slot and a location of frequency resources of a first frequency hop scheduled for the first full duplex slot; and a transmission power for a scheduled PUSCH repetition in the first full duplex slot; and means for transmitting the PUSCH repetitions in accordance with the adaptation.

26. A computer readable medium having instructions stored thereon for:

receiving, by a user equipment (UE), signaling scheduling the UE to transmit physical uplink shared channel (PUSCH) repetitions with frequency hopping;

adapting transmission of the PUSCH repetitions with frequency hopping, for one or more full duplex slots, wherein the adapting is based on at least one of:

a size of a first frequency gap between a downlink subband of a first full duplex slot and a location of frequency resources of a first frequency hop scheduled for the first full duplex slot; and a transmission power for a scheduled PUSCH repetition in the first full duplex slot; and transmitting the PUSCH repetitions in accordance with the adaptation.

* * * * *